United States Patent
Holly et al.

(10) Patent No.: US 9,651,105 B2
(45) Date of Patent: *May 16, 2017

(54) BRAKE ROTOR

(71) Applicant: GM Global Technology Operations LLC, Detroit, MI (US)

(72) Inventors: Michael L. Holly, St. Clair Shores, MI (US); Douglas N. Reed, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 710 days.

This patent is subject to a terminal disclaimer.

(21) Appl. No.: 13/967,486

(22) Filed: Aug. 15, 2013

(65) Prior Publication Data

US 2013/0327604 A1    Dec. 12, 2013

Related U.S. Application Data

(60) Continuation of application No. 13/611,030, filed on Sep. 12, 2012, now Pat. No. 8,585,833, which is a division of application No. 11/427,490, filed on Jun. 29, 2006, now Pat. No. 8,287,667.

(51) Int. Cl.
| | |
|---|---|
| *F16D 65/12* | (2006.01) |
| *C21D 1/607* | (2006.01) |
| *C23C 8/58* | (2006.01) |
| *F16D 69/02* | (2006.01) |

(52) U.S. Cl.
CPC ........... *F16D 65/127* (2013.01); *C21D 1/607* (2013.01); *C23C 8/58* (2013.01); *F16D 65/12* (2013.01); *F16D 65/125* (2013.01); *F16D 69/02* (2013.01); *F16D 2250/0038* (2013.01); *F16D 2250/0046* (2013.01); *F16D 2250/0053* (2013.01)

(58) Field of Classification Search
CPC .............. C23C 8/56; C23C 8/58; C21D 1/607
See application file for complete search history.

(56) References Cited

U.S. PATENT DOCUMENTS

| | | | |
|---|---|---|---|
| 2,407,197 | A * | 9/1946 | Watts .................... F16D 65/128 188/264 CC |
| 4,214,921 | A | 7/1980 | Henderson |
| 4,263,992 | A | 4/1981 | Moore et al. |
| 4,808,275 | A | 2/1989 | Ohzora et al. |
| 5,346,560 | A | 9/1994 | Mournet et al. |
| 5,389,161 | A | 2/1995 | Wawra et al. |
| 5,626,211 | A | 5/1997 | Gewelber et al. |

(Continued)

FOREIGN PATENT DOCUMENTS

| | | |
|---|---|---|
| CN | 1457407 A | 11/2003 |
| CN | 1566396 A | 1/2005 |

(Continued)

OTHER PUBLICATIONS

Kinkaid, N. M., O. M. O'Reilly, and P. Papadopoulos. "Automotive disc brake squeal." Journal of sound and vibration 267.1 (2003): 105-166.*

(Continued)

*Primary Examiner* — Jessee Roe
(74) *Attorney, Agent, or Firm* — BrooksGroup

(57) ABSTRACT

A number of variations may include a brake rotor having a surface oxide layer and methods of making the same.

7 Claims, 7 Drawing Sheets

(56) References Cited

U.S. PATENT DOCUMENTS

| | | | |
|---|---|---|---|
| 5,753,052 | A | 5/1998 | Dajoux et al. |
| 6,386,342 | B1 | 5/2002 | Tsuge et al. |
| 6,746,546 | B2 | 6/2004 | Easterday et al. |
| 7,077,247 | B2 | 7/2006 | Burgoon et al. |
| 8,287,667 | B2 * | 10/2012 | Holly .................... C21D 1/607 148/217 |
| 2003/0024608 | A1 | 2/2003 | Cooper |
| 2008/0000550 | A1 | 1/2008 | Holly et al. |

FOREIGN PATENT DOCUMENTS

| | | |
|---|---|---|
| DE | 19607369 A1 | 9/1996 |
| DE | 19919224 A1 | 4/2001 |
| EP | 0497663 B1 | 11/1994 |
| FR | 2672059 A1 | 7/1992 |

OTHER PUBLICATIONS

Easterday, J. R., "Technology Update, Liquid Ferritic Nitrocarburizing",Kolene Corp. , Detroit , Mi. 11 Pages . Copyright 2005.

"Kolene SBN TM Salt Bath Nitriding Process" of Kolene Corp., Detroit, Mi. 3 pages, website www.metaltreaters.com of Metal Treaters,Inc., St. Paul, MN, "MPMA journal " dated Jan./Feb. 1998.

Easterday,J.R., The Kolene QPQ An effective Surface Treatment Alternative to Cr Plating, Kolene Corp., Detroit, MI. 6 pages, copyright 2005.

"Nittromet TM" brochure of Kolene Corp., Detroit, MI . 2 pages, dated 2005.

Daudi, A. R., "Before and After Comparison of LRO and TV of Rotors After Temperature Gas Nitriding and Polymer Coat for Increased Corrosion Life", Paper 2000-010446 of SAE International, Warrendale, PA,15096, 15 pages, Mar. 2000.

ASM Handbook, "Introduction to Surface Hardening of Steels",vol. 4, pp. 259-267, 1991 ; copyright 2013 ASM International.

Srinivasan et al.,"Sliding Wear Behavior of Salt Bath Nitrocarburized Medium Carbon Steel" ASM International, JMEPEG (2002) pp. 509-515 ;vol. 11, Journal of Materials Engineering and Performance.

Zhou,Ding-Hua, "QPQ Technology and Quality Control," 1994-2009 China Academic Journal Electronic Publishing House,Jan. 2006, vol. 27, No. 1, 3 pages.

* cited by examiner

BRAKE ROTOR

CROSS-REFERENCE TO RELATED APPLICATIONS

This Application claims the benefit of Ser. No. 13/611,030, filed Sep. 12, 2012 which is presently pending; and Ser. No. 11/427,490, filed Jun. 29, 2006, which is now U.S. Pat. No. 8,287,667.

TECHNICAL FIELD

The present invention relates to the treatment of the surface of cast iron brake rotors to improve performance characteristics, and more particularly to the nitrocarburizing of the surface of cast iron brake rotors to mitigate the effects of rotor surface oxidation and corrosion.

BACKGROUND OF THE INVENTION

The brake rotor is an integral component of braking systems across multiple types of motor vehicles. The disc brake is an energy conversion device which converts mechanical energy to heat. Disc braking systems consist of a non-rotating friction material and application sub-systems, as well as a brake rotor that rotates with the wheel. To stop or slow the vehicle the friction material sub-system is engaged with the braking surfaces (rotor cheeks) of the brake rotor to generate heat due to friction, thereby converting mechanical energy to heat, and thereby slowing the rotation of the wheel.

The performance of the braking system, in general, and the brake rotor in particular, is determined to a large extent by the condition of the surface finish of the rotor cheeks. The normal course of operation of a brake system involves production of high levels of friction, which, in turn, generates high temperatures on the rotor cheek surfaces. Environmental effects caused by exposure to corrosive agents, such as road salt and water, exacerbate these problems. These effects, either singly or in combination, can result in pedal pulsation or a corroded braking surface.

The braking system is an aggressive environment for corrosion and high temperature oxidation of cast iron brake rotors. The oxides produced can preferentially spall during normal brake applications. Oxide spalling produces local high spots, which form deep grooves or scoring of the rotor cheek surfaces. These surface features can produce pedal pulsation during braking.

Open style wheel designs, which are currently very popular, leave the rotor braking surfaces visible to onlookers. Surface corrosion that would normally be inconsequential in the operation of the braking system becomes an issue due to the perception of this oxidation.

A variety of methods have been attempted to improve the performance of brake rotor surfaces with respect to oxidation and corrosion. Aluminum rich paint, such as a B90 coating, may be applied to the rotor, but is readily removed during an initial brake application. Ceramic coatings and metallic plates provide corrosion protection, however, these have negative, undesirable braking characteristics.

Gaseous ferritic nitrocarburizing provides a durable corrosion and oxidation resistant diffused case without a large negative effect on braking performance. However, this process may produce geometric distortions that are problematic. Additionally, gaseous ferritic nitrocarburizing may involve long cycle times. Case hardening techniques such as conventional carbonitriding as performed above a critical temperature of the ferrous material, can result in very high distortion, long cycle times and a case structure that is not optimized for corrosion performance.

Therefore, what remains needed in the art is a means of producing a ferritic nitrocarburized surface treatment of cast iron brake rotors, without causing distortions such as thickness variation and lateral run out, which provides corrosion and elevated temperature oxidation resistance.

SUMMARY OF THE INVENTION

The present invention is a means for producing a ferritic nitrocarburized surface treatment of cast iron brake rotors to thereby provide oxidation resistance and an absence of distortion to the case structure.

According to the present invention, a two salt bath ferritic nitrocarburizing process is used to treat ferrous brake rotors, wherein these treated brake rotors have improved properties of corrosion and high temperature oxidation resistance and have improved durability. The present invention involves a processing sequence and fixturing for salt bath ferritic nitrocarburizing while maintaining dimension control in the areas of lateral run out and thickness variation.

The basic process involves nitrocarburizing of either stress relieved or non-stress relieved finish machined pearlitic cast iron (ferrous material) brake rotors. The machined brake rotors are first pre-heated in air to a moderately elevated temperature. The brake rotors are then immersed (submerged) into a molten nitrocarburizing salt bath at an elevated, but sub-critical, temperature for a first predetermined dwell time. After removing the brake rotors from the nitrocarburizing salt bath, the brake rotors are directly immersed (submerged) into an oxidizing salt bath at a moderately lower temperature than the nitrocarburizing salt bath so that the brake rotors are thermally quenched by being rapidly cooled to the oxidizing salt bath temperature. After a predetermined second dwell time in the oxidizing salt bath, the brake rotors are removed from the oxidizing salt bath and further cooled to room temperature, either by water application thermal quenching or slow cooling in air.

According to the present invention, salt bath ferritic nitrocarburizing is a thermo-chemical diffusion process, whereby a pearlitic cast iron brake rotor is immersed (submerged) in an elevated, but sub-critical, temperature nitrocarburizing salt. This elevated temperature is kept below the critical temperature, which is the temperature at which a phase transition in the material of the brake rotor may occur. The resulting chemical reactions produce free nitrogen and carbon species which in turn diffuse into the surface of the brake rotor and combine with the iron therein, thus providing a hard case composed of a shallow compound zone, as for example of about 0.015 millimeters deep and having a hardness as for example of about at least HRC 50 equivalent which is resistant to wear and provides corrosion protection, and a subjacent diffusion zone of approximately 0.15 millimeters deep. The relatively short dwell time at the elevated temperature of the nirocarburizing salt bath, unique with salt bath ferritic nitrocarburizing, provides for control over the distortion of the brake rotors, which is a significant advantage over other (ie., gaseous) nitrocarburizing processes.

Another significant advantage the present invention has over other nitrocarburizing techniques is the degree of protection for the iron brake rotors from corrosion. This protection is produced through the treatment of the brake rotors after removal from the nitrocarburizing salt bath by immersing them into an oxidizing salt bath. The oxidizing salt bath oxidizes a surface layer of the compound zone of the cast iron brake rotor, thereby creating an oxidation resistant layer of protection greatly improving the wear properties of the cast iron brake rotors. This layer consists primarily of $Fe_3O_4$, as noted in FIG. 1B.

Accordingly, it is an object of the present invention to provide a means to create a corrosion and high temperature resistant case at the surface of cast iron brake rotors, while maintaining dimensional control.

This and additional objects, features and advantages of the present invention will become clearer from the following specification of a preferred embodiment.

DESCRIPTION OF THE PREFERRED EMBODIMENT

Figure 1A:
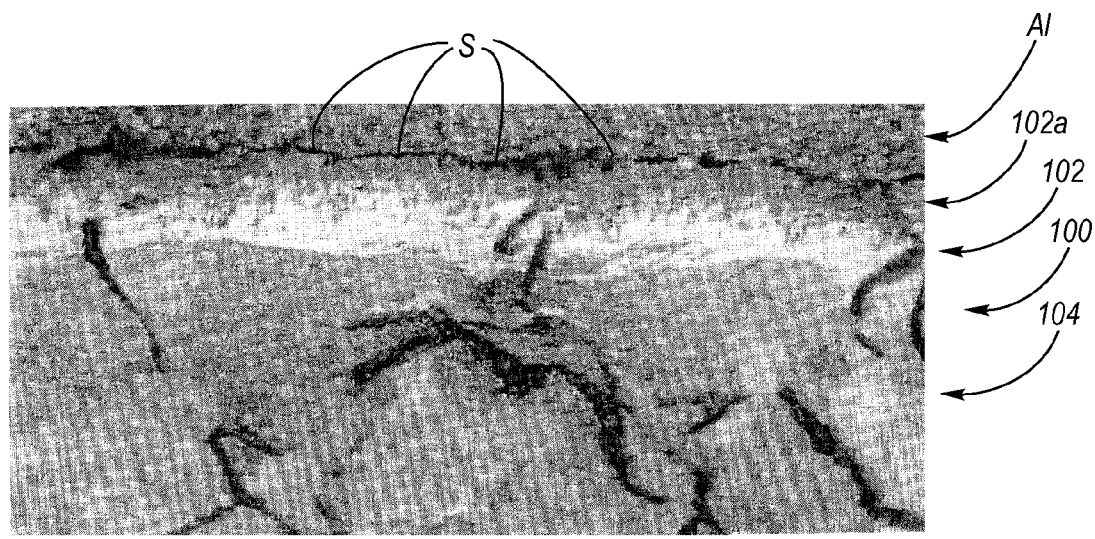
FIG. 1A is a depiction of a photomicrograph of the surface structure of the diffused case formed by a two salt bath ferritic nitrocarburizing of a pearlitic cast iron ferrous material brake rotor according to the present invention.

Referring now to the Drawing, FIGS. 1A through 5 depict an example of a two salt bath ferritic nitrocarburizing system (process and apparatus) for producing a ferritic nitrocarburized surface treatment of cast iron brake rotors. The following description of the preferred embodiments is merely exemplary in nature and is not intended to limit the invention, its applications, or its uses.

FIG. 1A shows a cross-section of the surface microstructure of a ferrous material 100, a pearlitic cast iron brake rotor, subjected to the salt bath ferritic nitrocarburizing process according to the present invention. This process initially introduces carbon and nitrogen simultaneously from a nitrocarburizing salt bath into the surface S of the ferrous material 100 (an aluminum foil Al which is shown is merely an artifact of the testing set-up, and it does not form a part of the ferrous material 100). Thereafter, the ferrous material 100 is treated in an oxidizing salt bath. This step of the process creates a layer of $Fe_3O_4$.

As a result of this two bath nitrocarburzing process according to the present invention, there are two distinct regions, or zones, of material: a compound zone 102 and a subjacent nitrogen diffusion zone 104 which is not resolvable metallographically in the ferrous material 100 (pearlitic cast iron).

The compound zone (layer or region) 102 is an outer portion of the ferrous material 100 after being treated first in the ferritic nitrocarburizing salt bath, then subsequently in the oxidizing salt bath. The compound zone 102 is formed initially through the reaction between the iron of the ferrous material 100 and nitrogen and carbon species from the nitrocarburizing salt bath. The compound zone 102 at this point is essentially a new phase of material, consisting predominantly of epsilon iron nitride, $Fe_3N$ and a smaller volume of gamma prime iron nitride $Fe_4N$. Thereafter, the ferrous material 100 is subjected to the oxidizing salt bath, whereupon a surface oxide layer 102a is formed composed of oxidized nitrocarburzied iron, $Fe_3O_4$.

Figure 1B:
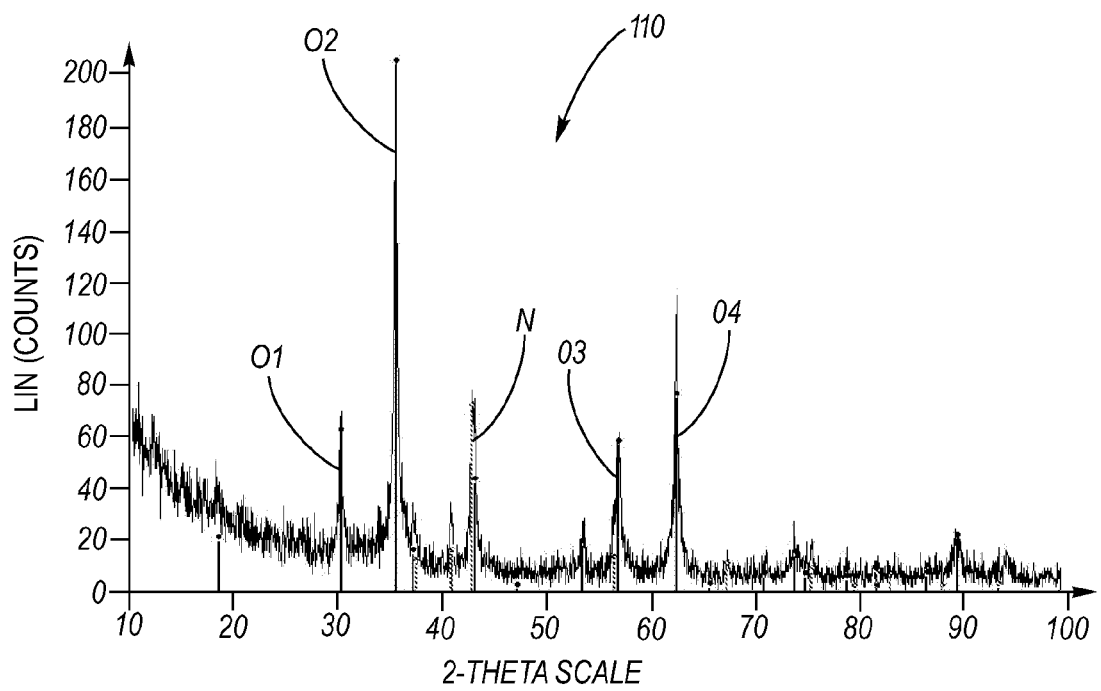
FIG. 1B is an X-Ray diffraction pattern of the brake rotor of FIG. 1A, depicting the phase composition at the outer most surface thereof, particularly indicating the presence of iron oxide ($Fe_3O_4$).

The diffusion zone (layer or region) 104 is disposed subjacent the compound zone 102 (ie., further into the ferrous material 100), consisting of the iron base ferrous material with a lower concentration of diffused nitrogen than that found in the compound layer, and with the nitrogen in solid solution with the base material. The depths of these two zones, i.e. compound zone 102 and the diffusion zone 104, are predictable and reproducible, which is a primary factor in the control of dimensional growth of the brake rotors as a result of the process Referring now to FIG. 1B, shown is an X-ray diffraction pattern 110 of the ferrous material 100 of FIG. 1A. (The specimen used to produce the photomicrograph, FIG. 1A, was taken from the same section of the brake rotor as the specimen used for the X-ray diffraction analysis, FIG. 1B. Technically, they may be considered two adjacent specimens from the same sample, and thus the surfaces examined represent the same microstructural characteristics.). The surface structure of the ferrous material is determined through employing Bragg's law, which relates the angle of X-Ray diffraction to the depth of the layer scattering the X-Rays. A sufficiently thick layer of material is required in order to create the constructive interference patterns shown in FIG. 1B. The thicker the layer, the more intense the X-Ray scattering, as indicated by higher count levels shown in FIG. 1B. The feature labeled N is the diffraction peak for iron nitride. The features labeled O1 through O4 are associated with layers of $Fe_3O_4$, most notably O2. This diffraction pattern provides independent corroboration of the photomicrographic assignments of FIG. 1A.

Figure 2:
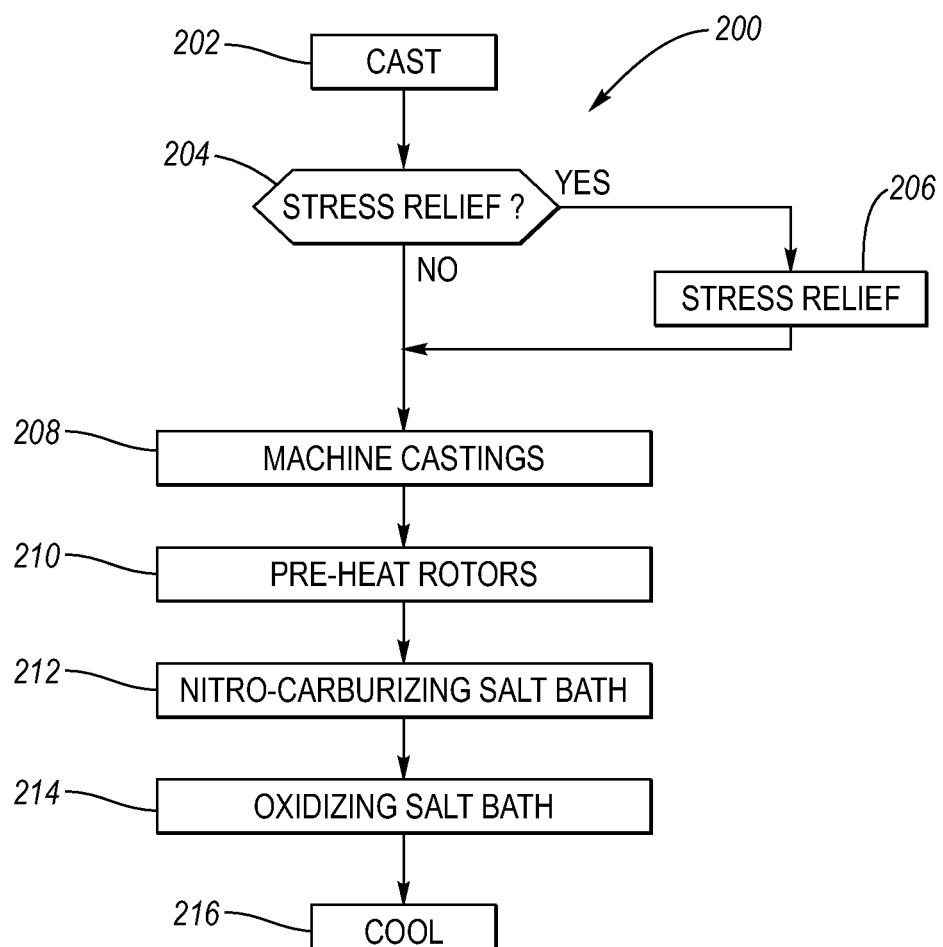
FIG. 2 is a block diagram showing the steps of the two salt bath ferritic nitrocarburizing of brake rotors according to the present invention.

FIG. 2 is a block diagram of the salt bath nitrocarburizing process 200 according to the present invention. The process begins at Block 202, whereat casting of pearlitic cast iron (ferrous material) brake rotors is performed in a generally conventional or known manner. At Decision Block 204, a decision is made whether to stress relieve the brake rotors from Block 202. If yes, then the process proceeds to Block

206, whereat stress relief is performed and the process then proceeds to Block 208. If no, then the process proceeds directly to Block 208.

At Block 208 finish machining of the brake rotors is performed. This is performed now because of the dimensional controls of the salt bath nitrocarburizing process of the present invention obviates machining later in the process. In this regard, since the dimensional growth of the brake rotors is predictable, the process is preferably adjusted by empirical or theoretical analysis so that the brake rotors will not require further machining upon completion of the salt bath nitrocarburizing process.

At Block 210, the brake rotors are preheated prior to submersion into the ferritic nitrocarburizing salt bath. This is accomplished through air heating in convection ovens or furnaces to about, for example, 400 degrees C. Pre-heating ensures the brake rotors will be free of moisture, which, if present, would react violently with the contents of the ferritic nitrocarburizing salt bath. Additionally, the pre-heating of the brake rotors is more efficiently performed ex-situ the nitrocarburizing salt bath as compared to allowing the brake rotors to come to thermal equilibrium in the ferritic nitrocarburizing salt bath from a substantially much lower temperature (ie., room temperature).

At Block 212, a nitrocarburizing salt bath is utilized. This salt bath consists of salts and reagents necessary to perform the ferritic nitrocarburizing surface treatment of the cast iron brake rotors. This salt bath consists of between 25 and 57 percent by weight cyanate, calculated as cyanate ion, between 0 and 5 percent by weight cyanide, calculated as cyanide ion, between 0 and 30 percent by weight alkali metal chloride and the balance as potassium ion, sodium ion and carbonate ion. The most preferred embodiment consists of between 34 percent and 38 percent by weight cyanate ion, with a target of 36 percent, between 0.5 percent and 3.0 percent by weight cyanide ion, with a target of 2 percent, and a target of 20 percent by weight of carbonate ion. In addition, the target ratio of potassium ion to sodium ion is 4 to 1.

An organic polymer regenerator is added to the nitrocarburizing salt bath at regular intervals to maintain stable concentrations of the cyanate ions necessary for the nitrocarburizing reactions. A preferable regenerator is either melamine or urea or a derivative of melamine, such as melam, melem and melom.

During processing, the cyanate ions of the salt bath react at the metal surface of the brake rotors as follows:

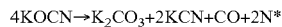

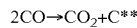

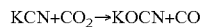

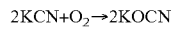

Nitrogen and carbon react with the iron of the ferrous material 100 as follows:

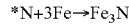

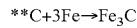

At Block 212, the brake rotors are immersed (submerged) into the nitrocarburizing salt bath at about, for example, 579 degrees C. for a period between 1 and 2 hours, more preferably for about one hour. This process introduces nitrogen and carbon into the surface structure of the brake rotor as described with respect to FIG. 1.

At Block 214, the brake rotors are removed from the nirtocarburizing salt bath, transferred to, and thereupon submerged in, an oxidizing salt bath at about 427 degrees C. for about 20 minutes. This oxidizing salt bath is an alkali hydroxide/nitrate mixture that oxidizes nitrocarburized ferrous material forming a combined oxide/nitride compound zone with a high resistance to corrosion. The preferred embodiment contains between 2 percent and 20 percent, most preferably between 10 percent and 15 percent, by weight nitrate ions, in the form of either sodium or potassium nitrate, between 25 percent and 40 percent by weight carbonate ion, in the form of either sodium or potassium carbonate, and the balance as hydroxide ion, in the form of either sodium or potassium hydroxide.

During this process, the following neutralization reactions occur:

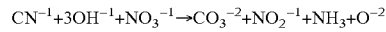

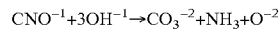

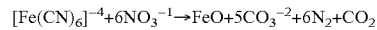

Additionally, the oxidizing salt bath is used as an intermediate thermal quenching step to cool the brake rotors with minimal thermal differentials and mitigation of potential distortions.

At Block 216, the brake rotors are removed from the oxidizing salt bath of Block 214 and are further cooled to room temperature either by air-cooling or a further step thermal quenching by water application (spray or dip) cooling. The nitrocarburized cast iron brake rotors are then water rinsed to remove reagents of Block 214, and then are oil dipped, whereupon the nitrocarburized brake rotors are ready to be shipped for motor vehicle assembly.

Figure 3A:
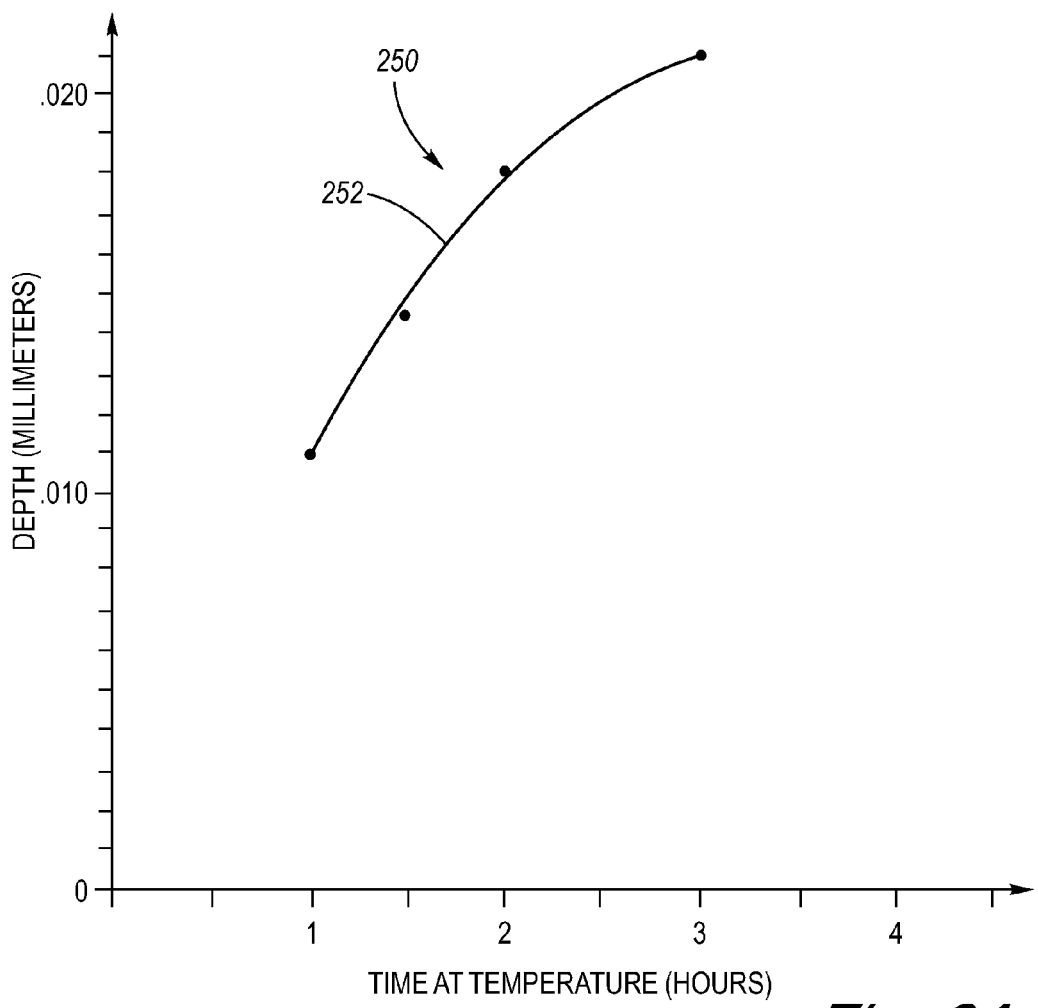
FIG. 3A is a graph showing the depth of the compound zone as a function of time the brake rotor has spent in the ferritic nitrocarburizing salt bath.

FIG. 3A shows a graph 250 with a plot 252 indicative of compositional layers within the ferrous material 100 of FIG. 1A. The plot 252 shows the depth of the compound zone 102 of FIG. 1A as a function of the time the brake rotor dwells in the nitrocarburizing salt bath at Block 212. This depth is determined by measuring the depth of the highly concentrated nitrogen species diffusion into the iron substrate 100 of FIG. 1A. The data shows that after one hour of submersion in the ferritic nitrocarburizing salt bath, the compound zone has a depth of 0.011 millimeters. After two hours of submersion in the ferritic nitrocarburizing salt bath, the data shows the compound zone has a depth of 0.018 millimeters.

Figure 3B:
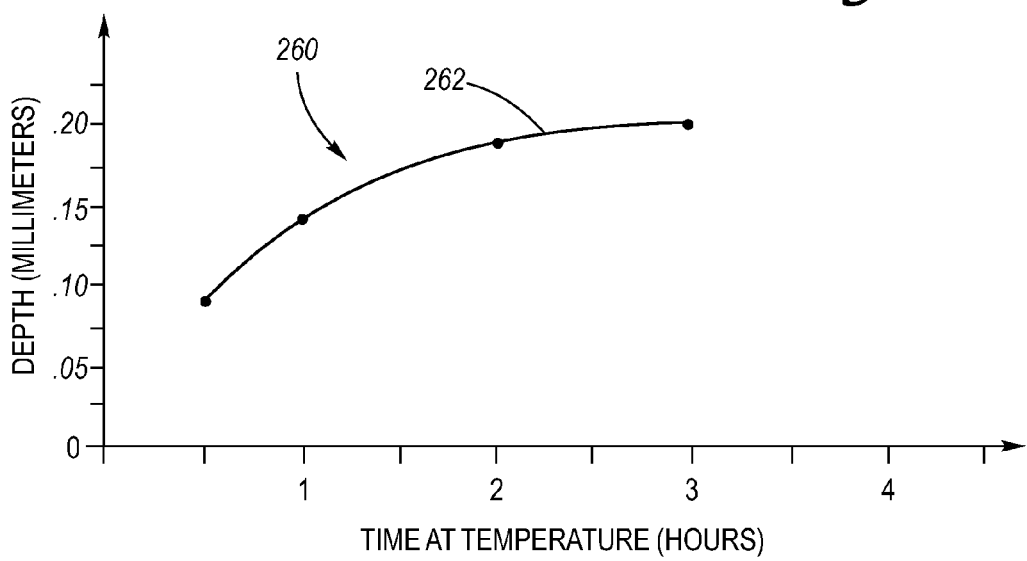
FIG. 3B is a graph showing the depth of total nitrogen diffusion as a function of time the brake rotor has spent in the ferritic nitrocarburizing salt bath.

FIG. 3B shows a graph 260 with a plot 262 showing the depth of the total nitrogen diffusion region. The data shows that after one hour of submersion in the ferritic nitrocarburizing salt bath, the total nitrogen diffusion zone has a depth of 0.14 millimeters. After two hours, of submersion in the the ferritic nitrocarburizing salt bath, the data shows the total nitrogen diffusion zone has a depth of 0.18 millimeters. This data is important because the depth of nitrogen diffusion into the ferrous material 100 is correlated with enhancement of mechanical engineering properties of the brake rotors Turning attention now to FIGS. 4A through 5, a preferred fixture for placement of the brake rotors into the nitrocarburizing and oxidizing salt baths.

Figures 4A, 4B:
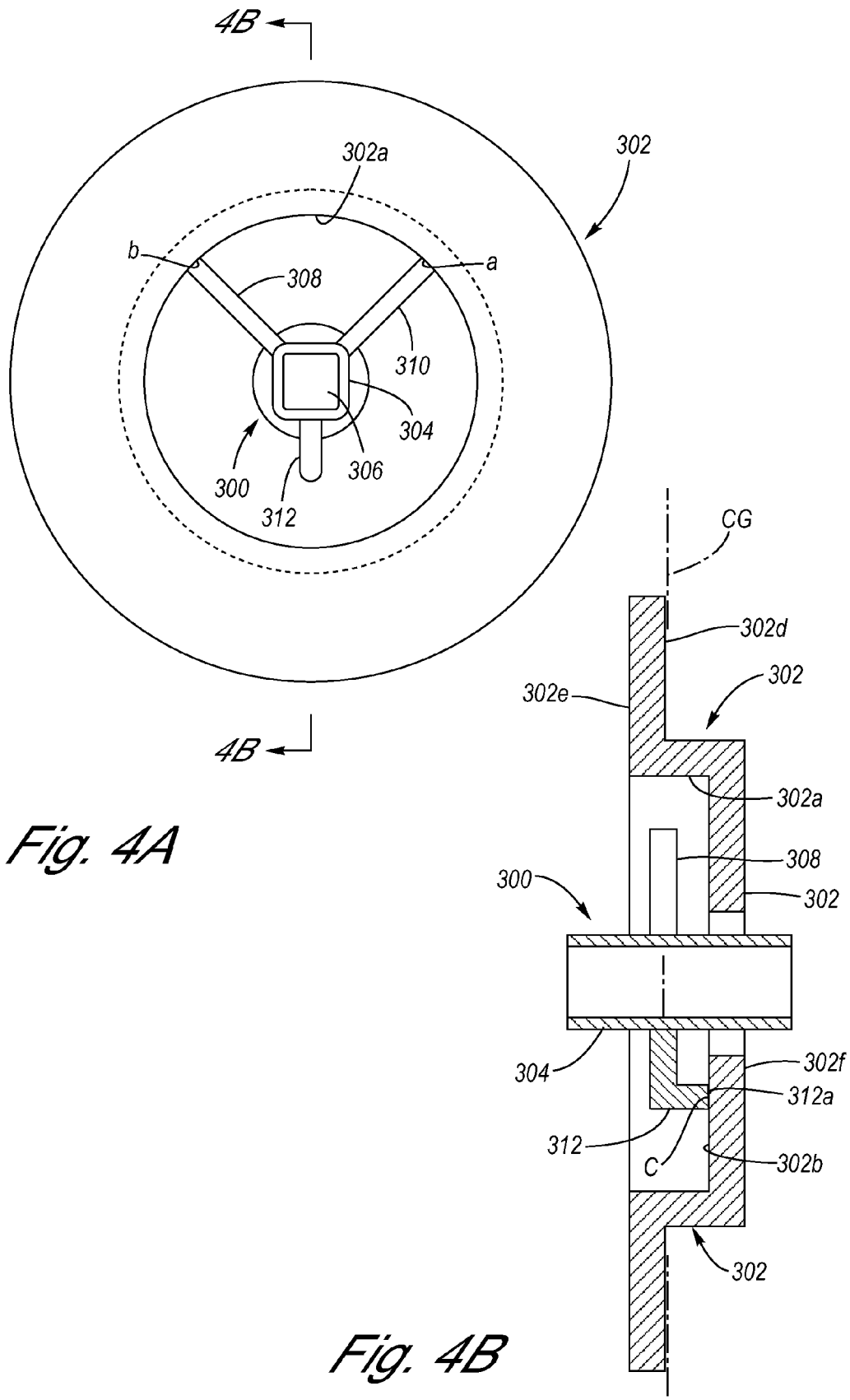
FIG. 4A is a side view of a rotor holder for holding a single brake rotor during placement in a ferritic nitrocarburizing salt bath according to the present invention.
FIG. 4B is a sectional view, seen along line 4B-4B of FIG. 4A.

Referring firstly to FIGS. 4A and 4B, a rotor holder 300 for supporting an individual brake rotor 302 includes a hub 304 having a central opening 306, which may preferably be of a square shape. A pair of rotor support posts 308, 310, are rigidly affixed to the hub 304, whereby the rotor support posts are at, preferably, 90 degrees to each other, wherein where the hub has a square shape it is preferred for the rotor support posts to be oriented orthogonally to the corners of the hub, as depicted in FIG. 4A. An L-shaped rotor location post 312 is rigidly affixed to the hub at a location on the opposite side of the hub 304 in relation to a bisection of the angle subtending the rotor support posts.

The dimensions of the rotor support posts 308, 310 and the rotor location post 312 in relation to a brake rotor are as follows: the rotor support posts abut the inner race 302a of the brake rotor such that the hub is concentrically disposed with respect to the inner race; and a terminal end 312a of the rotor location post abuts the inner face 302b of the brake rotor hat 302c such that the plane of the center of gravity CG of the brake rotor bisects the rotor support posts, as depicted at FIG. 4B.

It is to be understood from the foregoing structural description, that the rotor holder 300 interfaces with only three local locations a, b, c of the brake rotor 302, all of which being locations at which an absence of treatment by the two bath nitrocarburizing treatment process according to the present invention has no noticeable effect; indeed all other areas of the brake rotor are fully exposed, particularly the brake rotor cheeks 302d, 302e and the exterior side 302f of the brake rotor hat 302c. In addition, it will further be seen that the placement of the brake rotor 302 onto the rotor holder 300 is extremely simplistic, as there are no mechanical interlockings, yet the brake rotor will rest upon the rotor in a completely stable manner.

Figure 5:
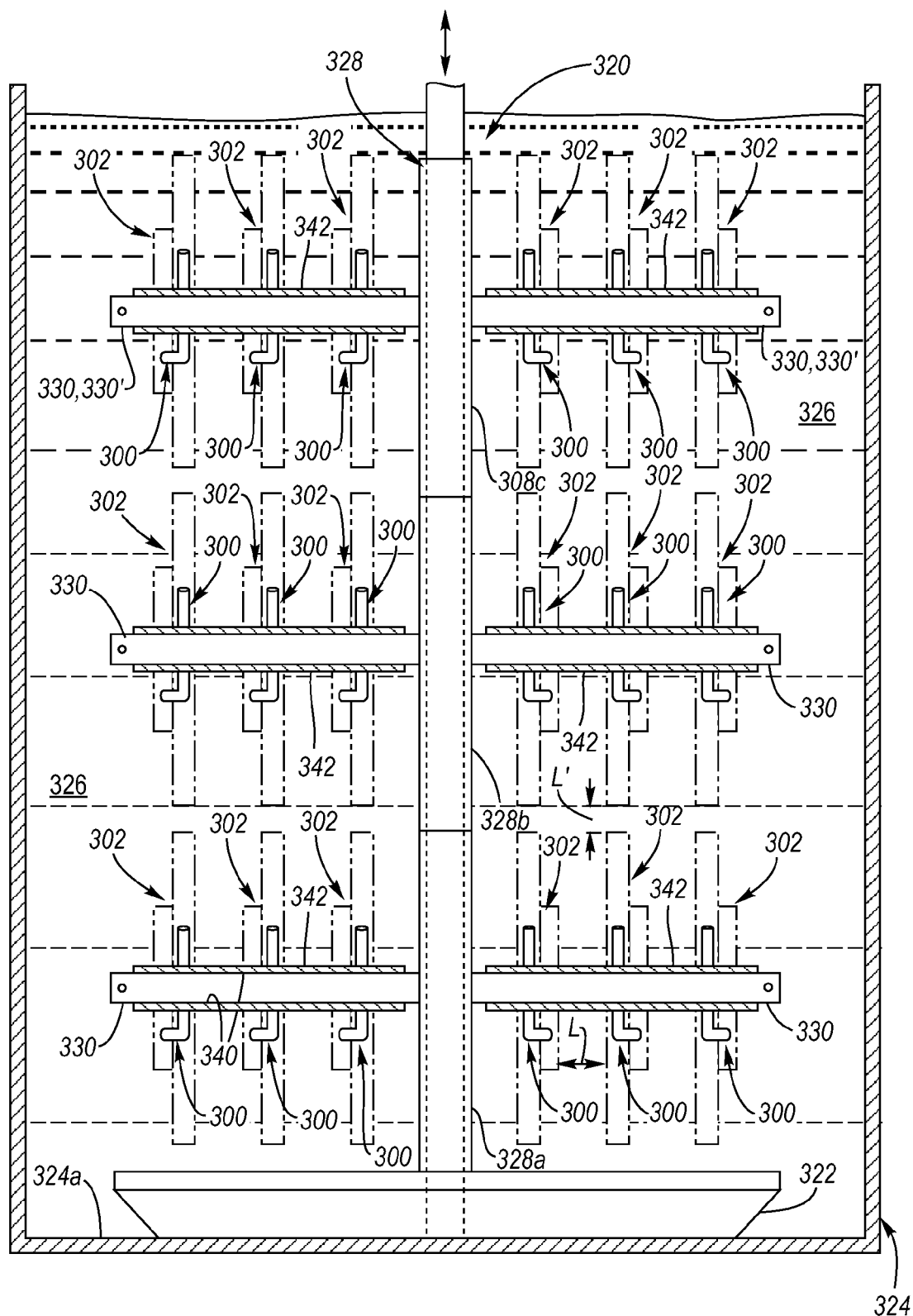
FIG. 5 is a partly sectional side view of a fixture for grouping rotor holders, each supporting, in mutually spaced relation, brake rotors in either of a ferritic nitrocarburizing salt bath or an oxidizing salt bath according to the present invention.

Referring now to FIG. 5, an example of a rotor holder fixture 320 composed of a plurality of the aforedescribed rotor holders 300 will be detailed.

The rotor holder fixture 320 is provided with a suitably large circumscribing base 322 for stably resting upon a floor 324a of a tank 324, wherein the tank holds a salt bath 326, either the nitrocarburizing salt bath or the oxidizing salt bath of the two bath nitrocarburizing treatment process according to the present invention. A mast 328 is rigidly affixed centrally to the base 322 and rises up through the tank (ie., extends normal to the floor 324a). The mast 328 provides the support of any number of interconnecting segments, as for example segment 328a, segment 328b, and segment 328c, as shown at FIG. 5.

At suitable junctures in height above the base 322 (to provide adequate bath access spacings between adjacent brake rotors, as discussed hereinbelow), arms 330 are perpendicularly attached to the main segments, 328a, 328b, and 328c, as for example by welding. In the view of FIG. 5, there are three vertical sets of pairs of arms 330 (one pair of arms for each mast segment), as would suit a tank having an elongated rectangular shape. If the tank were shaped round or square, then an additional three vertical sets of pairs of arms would be attached to the mast (one additional pair of arms for each mast segment) in a direction perpendicular to the arms shown (ie., in and out of the plane of the paper).

Slid onto each arm 330, which may or may not include splines 340 therebetween, is a holder sleeve 342. Any number of rotor holders 300, as above described with respect to FIGS. 4A and 4B, may be connected rigidly to a holder sleeve 342, as for example by the hub thereof being integral with the holder sleeve. In the exemplar view of FIG. 5, the hubs of three rotor holders are integral constituents of each holder sleeve.

It will be seen by reference to FIG. 5, that with each rotor holder 300 loaded with its respective brake rotor 302, the salt bath 326 is able to wet the brake rotors everywhere, except the three aforementioned rotor holder contact locations (see a, b, c of FIG. 4B). Additionally, it will be noted that a suitable horizontal distance L is maintained between brake rotors 302 parallel to the arms 330 and vertical distance L' parallel to the mast 328 so that the bath 326 has free and open access to each and every brake rotor, whereby dimensional control is provided during treatment in the bath.

To vertically lift and lower the rotor holder fixture 320, a conventional lifting apparatus is utilized (not shown) which interfaces with the mast 328. For example, a crane apparatus may engage the upper end of the mast via a gripper or other mechanism.

In operation, the rotor holder fixture is assembled in terms of the base, mast, arms and rotor holder carrying holder sleeves. Next, each rotor holder is loaded with its respective brake rotor. The rotor holder fixture is then subjected to the pre-heating step, as described hereinabove, and then the rotor holder fixture is lowered into the tank so that all the brake rotors are wetted by the salt bath. Upon completion of the desired bath dwell time, the rotor holder fixture is then removed from the tank for further processing of the brake rotors according to the present invention.

Dimensional change of the brake rotors during the process according to the present invention may be due to either mechanically induced stresses and/or stresses developed due to thermal conditions.

Regarding mechanical stresses, there is a benefit to properly supporting the rotor during the process according to the present invention by the configuration of the rotor holder 302 and the fixture 320. A further advantage of placement of the brake rotors into the salt bath 326 is buoyancy of the brake rotors, whereby the high density of the liquid medium of the salt bath provides added support to the brake rotor during salt bath treatment, which thereby tends to mitigate mechanical stresses.

Regarding thermally induced stresses, a few processing parameters need to be considered: the temperature of the nitrocarburizing salt bath; dwell time within the nitrocarburizing salt bath, per its temperature; and the rate of cooling of the brake rotors thereafter. The temperature of nitrocarburizing salt bath is based on empirically produced microstructural phase diagrams that define the required chemical reactions as a function of temperature. For a nitrocarburizing salt bath as used according to the present invention to treat brake rotors, a temperature of about 580 degrees C. is preferred. The depth of the nitride compound that is formed is dependant on the length of time (dwell time) of the brake rotor at this temperature.

Greater dimensional stability of the rotor can be best achieved by minimizing the dwell time at a given nitrocarburizing salt bath temperature. Chemical reactions within the nitrocarburizing salt bath develop a high nitrogen concentration (activity) which in turn enables shorter dwell times (as compared with gaseous dwell times) at a given temperature.

Minimizing thermal differentials within the brake rotor as it is cooled from the nitrocarburizing salt bath temperature also helps to reduce thermally induced stresses and, thus, encourages dimensional stability. This is accomplished by interrupted cooling, or step quenching from the nitrocarburizing salt bath temperature to room temperature by using a quench salt bath of about 427 degrees C., then followed by water or air cooling to room temperature.

Conventional production brake rotors (production rotors) were compared in a series of tests to brake rotors treated by the process according to the present invention (treated rotors).

In a series of friction tests, the apparent friction of a production rotor was compared to that of a treated rotor and was found to be, on average, only four percent above that of a treated rotor (indeed, for burnished brake rotors, the treated rotors had higher friction, for both cold and warm tests, than the production rotors). Therefore, it can be concluded that brake rotor friction is acceptably high for brake rotors treated by the process according to the present invention.

Figure 6:
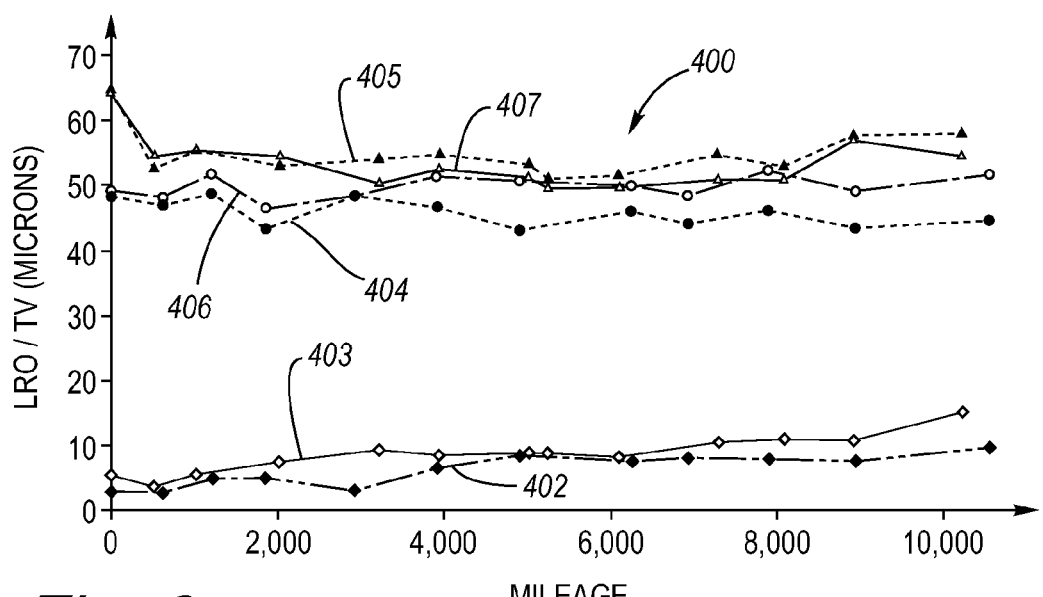
FIG. 6 is a graph, the plots of which showing results of wear tests of production brake rotors and brake rotors having surface ferritic nitrocarburizing treatment according to the present invention.

In a series of wear tests, as shown at FIG. 6, three production rotors 402, 404, 406 were compared, respectively, with three treated rotors 403, 405, 407 (ie., production rotor 402 compared to treated rotor 403, production rotor 404 compared to treated rotor 405, and production rotor 406 compared to treated rotor 407). The resulting graph 400 of lateral run out per thickness variation (LRO/TV) versus motor vehicle driving mileage indicates that the treated rotors wear quite favorably as compared with the production rotors.

Figure 7:
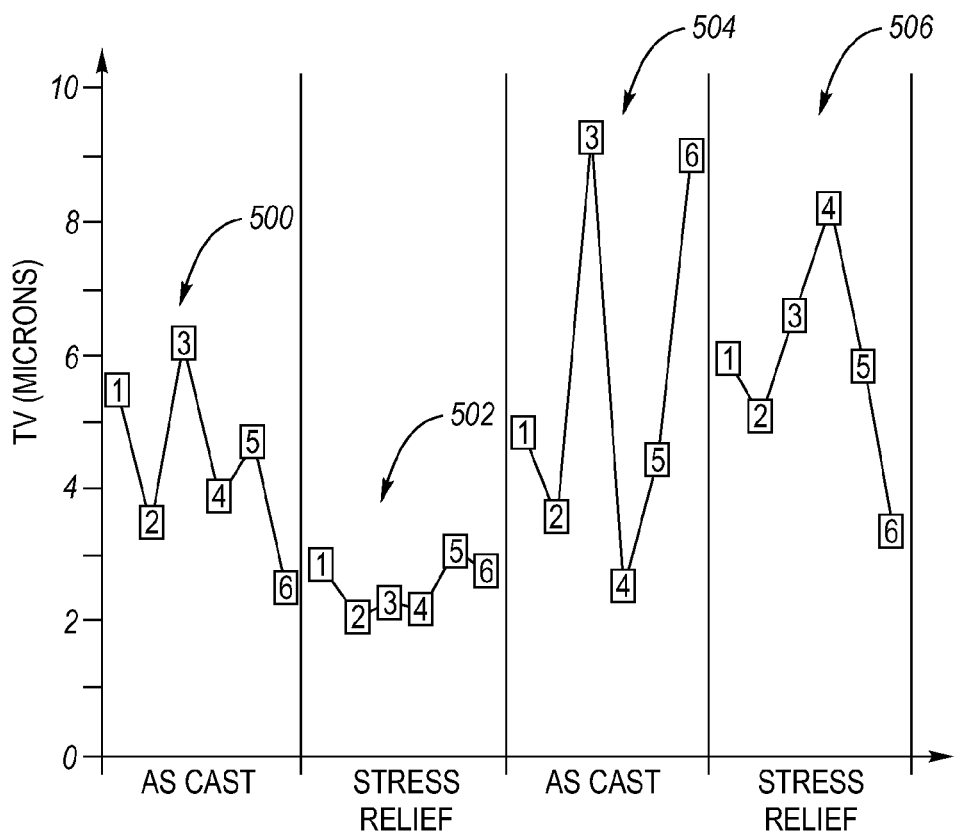
FIG. 7 is a graph, the plots of which showing results of thickness variation tests of stress relieved and non-stress relieved brake rotors having surface ferritic nitrocarburizing treatment according to the present invention.

A series of thickness variation tests were conducted, shown at FIG. 7, for pairs of batches of six stress relieved treated rotors and non-stress relieved (as cast) treated rotors for one hour nitrocarburizing salt bath treatment, graphs 500 and 502 respectively, and two hour nitrocarburizing salt bath treatment, graphs 504 and 506, respectively. It will be seen from FIG. 7 that stress relieved treated rotors have a less thickness variation than non-stress relieved treated rotors, and that the treated rotors having one hour dwell in the nitrocarburizing salt bath had less thickness variation than those having a two hour dwell time.

Figure 8A:
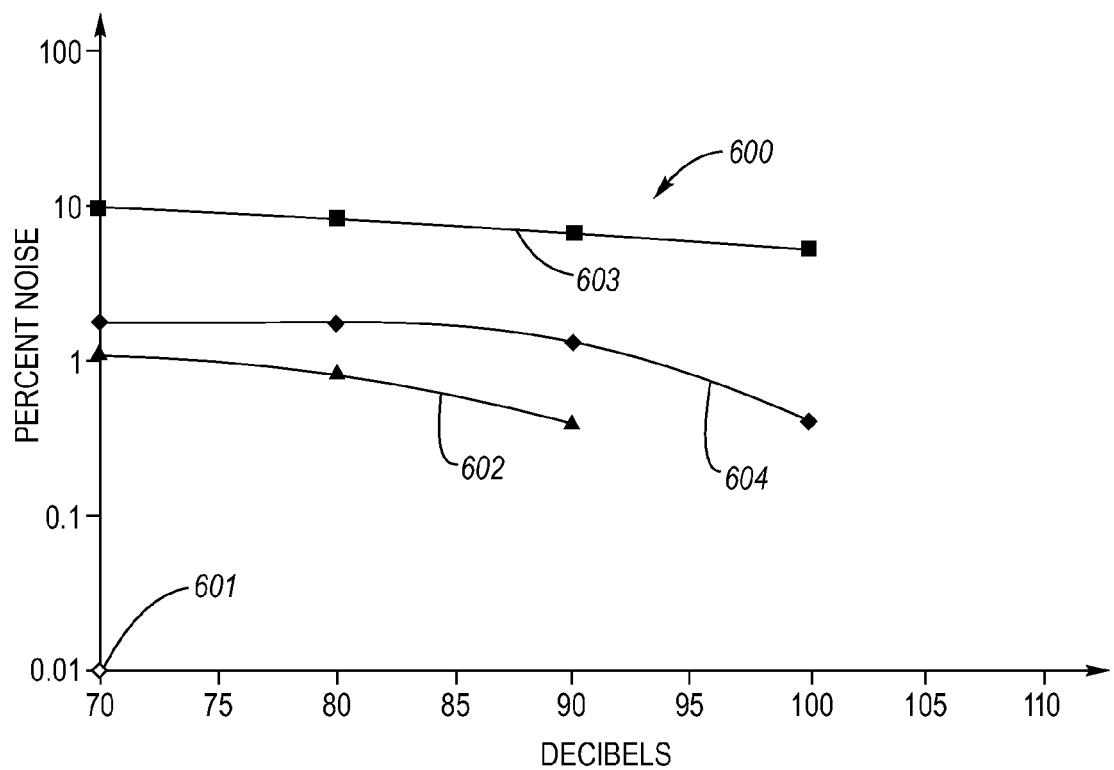
FIGS. 8A and 8B are graphs, the plots of which indicating braking noise tests for production brake rotors and brake rotors having surface ferritic nitrocarburizing treatment according to the present invention, wherein FIG. 8A pertains to cold rotors and FIG. 8B pertains to warm rotors.
Figure 8B:
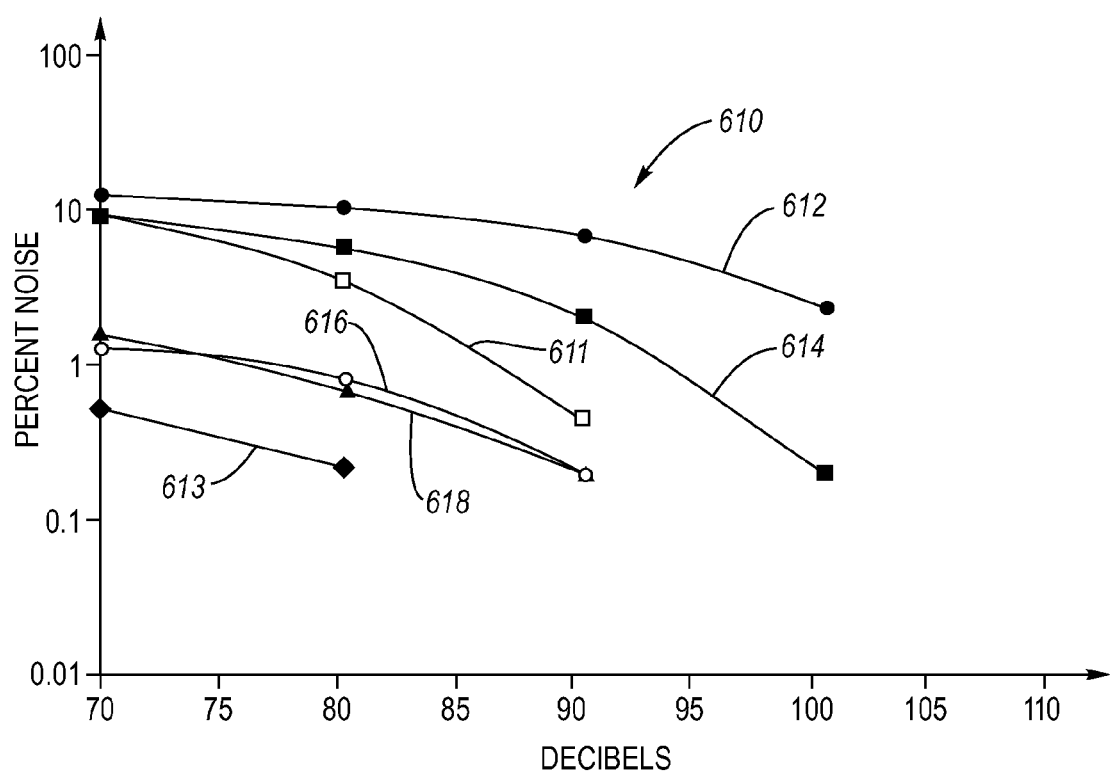

A series of noise tests were conducted. As shown by the graph 600 of FIG. 8A of percent noise versus decibels, cold production rotors 602, 604 were compared to cold treated rotors 601, 603. It is seen from FIG. 8A that the cold treated rotors had noise levels quite favorable as compared to the cold production rotors. As shown by the graph 610 of FIG. 8B of percent noise versus decibels, warm production rotors 612, 614, 616, 618 were compared to warm treated rotors 611, 613. It is seen from FIG. 8B that the warm treated rotors had noise levels quite favorable as compared to the warm production rotors.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A nitrocarburized ferrous brake rotor of a motor vehicle, wherein the brake rotor has disposed at a surface thereof an oxide layer comprising $Fe_3O_4$, and further comprising a compound zone including the oxide layer, the compound zone further comprising, generally subjacent the oxide layer, a first concentration of diffused nitrogen; and
   a diffusion zone subjacent the compound zone, the diffusion zone comprising cast iron with a second concentration of diffused nitrogen lower than the first concentration of diffused nitrogen of the compound layer.

2. A nitrocarburized ferrous brake rotor of a motor vehicle, wherein the brake rotor has disposed at a surface thereof an oxide layer comprising $Fe_3O_4$, wherein the brake rotor further comprises:
   a compound zone including the oxide layer, the compound zone further comprising, generally subjacent the oxide layer, predominantly of epsilon iron nitride $Fe_3N$ and a smaller volume of gamma prime iron nitride $Fe_4N$; and
   a diffusion zone subjacent the compound zone, the diffusion zone comprising iron base ferrous material with a lower concentration of diffused nitrogen than that of the compound layer,
   wherein the iron base ferrous material comprises cast iron.

3. A nitrocarburized ferrous brake rotor of a motor vehicle, wherein the brake rotor has disposed at a surface thereof an oxide layer comprising $Fe_3O_4$, wherein nitrocarburized ferrous brake rotor comprises cast iron and wherein the oxide layer is constructed and arranged so the friction properties of the brake rotor are within four percent of the friction properties of a cast iron brake rotor not having been ntirocarburized nor having the oxide layer.

4. A brake rotor comprising:
   at least a first brake rotor cheek comprising pearlitic cast iron and having a compound zone comprising an oxide layer comprising $Fe_3O_4$; and generally subjacent said oxide layer is predominantly epsilon iron nitride $Fe_3N$ and a smaller volume of gamma prime iron nitride $Fe_4N$; and
   a diffusion zone disposed subjacent said compound zone, the diffusion zone comprising iron base ferrous material with a lower concentration of diffused nitrogen than that of said compound layer with the nitrogen in solid solution with the base ferrous material, further comprising a hat connected to the at least one rotor cheek, said hat having an exterior side; further comprising said exterior side of said hat having said ferritic nitrocarburized surface treatment defined by said compound zone and said diffusion zone.

5. The brake rotor of claim 4, wherein said compound and diffusion zones collectively comprise a case, wherein said compound zone has a depth of substantially 0.015 millimeters, and wherein said diffusion zone has a depth of substantially 0.15 millimeters and wherein said compound zone has a hardness of substantially at least HRC 50 equivalent.

6. A nitrocarburized ferrous brake rotor of a motor vehicle, wherein the brake rotor comprises oxide layer comprising $Fe_3O_4$, and with the proviso that there is no antiseizing coating over the oxide layer, and comprising a compound zone including the oxide layer, the compound zone further comprising, generally subjacent the oxide layer, a first concentration of diffused nitrogen; and
   a diffusion zone subjacent the compound zone, the diffusion zone comprising cast iron with a second concentration of diffused nitrogen lower than the first concentration of diffused nitrogen of the compound layer.

7. A nitrocarburized ferrous brake rotor of a motor vehicle, wherein the brake rotor has disposed at a surface thereof an oxide layer comprising $Fe_3O_4$, wherein nitrocarburized ferrous brake rotor comprises cast iron and wherein the oxide layer is constructed and arranged so the apparent friction of the brake rotor is four percent less than that of a cast iron brake rotor not having been ntirocarburized nor having the oxide layer.

* * * * *